(12) United States Patent
Huang et al.

(10) Patent No.: US 11,055,429 B2
(45) Date of Patent: Jul. 6, 2021

(54) KEY PROVIDING METHOD, VIDEO PLAYING METHOD, SERVER AND CLIENT

(71) Applicant: WANGSU SCIENCE & TECHNOLOGY CO., LTD., Shanghai (CN)

(72) Inventors: Zhenlin Huang, Shanghai (CN); Yunhui Chen, Shanghai (CN); Shaozhuo Fan, Shanghai (CN)

(73) Assignee: WANGSU SCIENCE & TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 16/516,326

(22) Filed: Jul. 19, 2019

(65) Prior Publication Data

US 2019/0340384 A1 Nov. 7, 2019

Related U.S. Application Data

(63) Continuation of application No. PCT/CN2018/079499, filed on Mar. 19, 2018.

(30) Foreign Application Priority Data

Feb. 9, 2018 (CN) .......................... 201810136728.5

(51) Int. Cl.
*H04N 21/262* (2011.01)
*H04N 21/266* (2011.01)
(Continued)

(52) U.S. Cl.
CPC .......... *G06F 21/6227* (2013.01); *G06F 16/71* (2019.01); *G06F 21/604* (2013.01); *H04N 21/26613* (2013.01); *H04N 21/47202* (2013.01)

(58) Field of Classification Search
CPC ................... H04N 21/26613; H04N 21/26258
See application file for complete search history.

(56) References Cited

U.S. PATENT DOCUMENTS

| 9,215,065 B2 | 12/2015 | Xiques et al. |
| 2011/0080940 A1 | 4/2011 | Bocharov et al. |
| (Continued) | | |

FOREIGN PATENT DOCUMENTS

| CN | 101883255 A | 11/2010 |
| CN | 103428583 A | 12/2013 |
| (Continued) | | |

OTHER PUBLICATIONS

International Search Report for International Application No. PCT/CN2018/079499 dated Sep. 27, 2018.
(Continued)

*Primary Examiner* — Hsiungfei Peng
(74) *Attorney, Agent, or Firm* — Heslin Rothenberg Farley & Mesiti P.C.

(57) ABSTRACT

The present application discloses a key providing method, a video playing method, a server and a client, in which the video playing method includes: sending a download request to the server and receiving an index file of a target video data delivered by the server; constructing an access request based on a specified string in the index file, and sending the access request to the server to acquire from the server a preset key which the access request is directed to; sending to the server a file acquisition request including a file address to acquire from the server encrypted fragmented data which the file address of the fragmented data is directed to; decrypting the acquired encrypted fragmented data by using the preset key, and playing the decrypted fragmented data. The technical solutions provided in the present application can effectively protect copyrights of video data.

13 Claims, 6 Drawing Sheets

(51) Int. Cl.
*H04N 21/2347* (2011.01)
*H04N 21/472* (2011.01)
*H04N 21/482* (2011.01)
*H04N 21/835* (2011.01)
*H04N 21/854* (2011.01)
*G06F 21/10* (2013.01)
*G06F 21/60* (2013.01)
*G06F 21/62* (2013.01)
*G06F 21/71* (2013.01)
*G06F 16/71* (2019.01)

(56) References Cited

U.S. PATENT DOCUMENTS

| | | |
|---|---|---|
| 2011/0231660 A1 | 9/2011 | Kanungo |
| 2012/0246462 A1 | 9/2012 | Moroney et al. |
| 2013/0163758 A1 | 6/2013 | Swaminathan et al. |
| 2014/0270167 A1 | 9/2014 | Cureau et al. |
| 2015/0271541 A1* | 9/2015 | Gonder ............ H04L 65/605 725/134 |
| 2017/0346865 A1* | 11/2017 | Hartman ............ H04N 21/2541 |

FOREIGN PATENT DOCUMENTS

| | | |
|---|---|---|
| CN | 103957436 A | 7/2014 |
| CN | 104320377 A | 1/2015 |
| CN | 104902343 A | 9/2015 |
| CN | 105847869 A | 8/2016 |
| CN | 105915494 A | 8/2016 |
| CN | 105939484 A | 9/2016 |
| CN | 106028064 A | 10/2016 |
| CN | 106028154 A | 10/2016 |
| CN | 106331751 A | 1/2017 |
| CN | 106790074 A | 5/2017 |
| CN | 106791986 A | 5/2017 |
| CN | 106936770 A | 7/2017 |
| CN | 107404379 A | 11/2017 |
| CN | 107659829 A | 2/2018 |
| EP | 3209025 A1 | 8/2017 |
| WO | 2014090761 A1 | 6/2014 |

OTHER PUBLICATIONS

European Search Report for International Application No. PCT/CN2018/079499 dated Oct. 1, 2020.

Dongyan Zhang et al., "Research on Video Anti-hotlinking for OTT", IEEE First International Conference on Data Science in Cyberspace (DSC), Jun. 13, 2016, pp. 345-439.

Christian D'Orazio et al., "An adversary model to evaluate DRM protection of video contents on iOS devices", Computers & Security, Elsevier Science Publishers, Jul. 6, 2015, vol. 56, pp. 94-110.

Examination Report for Chinese Patent Application No. 201810136728.5 dated Jan. 2, 2020.

Search Report for Chinese Patent Application No. 201810136728.5 dated Aug. 31, 2020.

Yuan, K., et al., "Anti-stealing-link system for streaming media server", Technological Development of Enterprise, vol. 26, No. 1, pp. 9-11 (2007), English abstract.

* cited by examiner

KEY PROVIDING METHOD, VIDEO PLAYING METHOD, SERVER AND CLIENT

CROSS-REFERENCE TO RELATED APPLICATIONS

The present application is a continuation of international application No. PCT/CN2018/079499, filed on Mar. 19, 2018, which claims priority to Chinese Application No. 201810136728.5 filed on Feb. 9, 2018. The specification of each of the aforementioned applications are incorporated herein by reference in their entireties.

TECHNICAL FIELD

The present application relates to the technical field of Internet technologies, and in particular, relates to a key providing method, a video playing method, a server and a client.

BACKGROUND

With continuous development of video-on-demand technologies and live-broadcasting video technologies, protocols enforced in video data transmission processes are also constantly improving. Currently, the Http Live Streaming (also known as HLS) protocol developed by Apple Inc. of the United States is widely used. The HLS protocol is a dynamic and self-adaptive bitrate streaming media protocol in which large media files may be segmented into numerous small fragmented files. Video data using the protocol usually have an index file which may include a download address of each fragmented file and a key used to encrypt each fragmented file. Since the HLS protocol is an open streaming media protocol, a key in the index file is provided directly in plaintext. With reference to FIG. 1, in the existing technologies, if the HLS protocol is used to play video data at a client, the index file of the video data may be first downloaded from a server storing the video data, and then a key provided in plaintext may be acquired from the index file. In addition, the client may further acquire an encrypted fragmented file from the server according to the download address in the index file. In this way, the client can decrypt the encrypted fragmented file by using the key, so that the decrypted fragmented file can be played.

However, this open protocol usually brings about the following defects: whatever client can directly acquire, from an index file, a key adopted when encrypting a fragmented file as long as the client supports the HLS protocol. In this way, privacy of video data may be seriously interfered, and copyright of the video data cannot get protected.

SUMMARY

The present application aims to provide a key providing method, a video playing method, a server and a client that may effectively protect copyrights of video data.

In order to overcome the above-described problems, the present application provides a key providing method, including: segmenting target video data into a plurality of fragmented data, encrypting each piece of the plurality of fragmented data based on a preset key, and storing the encrypted fragmented data in a specified directory to generate a file address of each piece of the encrypted fragmented data; generating an initial index file which includes the file address of each piece of the encrypted fragmented data and the preset key; replacing the preset key in the initial index file with a specified string to obtain a modified index file as an index file of the target video data; receiving a download request that is sent by a client and is directed to the target video data, and providing the modified index file to the client, so that the client constructs an access request that is directed to the preset key based on the specified string in the modified index file; receiving the access request sent by the client, and providing the preset key to the client in response to the access request.

In order to solve the above-described problems, the present application further provides a server including a memory and a processor, the memory storing a computer program, and the processor, when executing the computer program, performs the following steps: segmenting target video data into a plurality of fragmented data, encrypting the plurality of fragmented data based on a preset key, and storing the encrypted fragmented data in a specified directory to generate a file address of each piece of the encrypted fragmented data; generating an initial index file which includes the file address of each piece of the encrypted fragmented data and the preset key; replacing the preset key in the initial index file with a specified string to obtain a modified index file as an index file of the target video data; receiving a download request that is sent by a client and is directed to the target video data, and providing the modified index file to the client, so that the client constructs an access request that is directed to the preset key based on the specified string in the modified index file; receiving the access request sent by the client, and providing the preset key to the client in response to the access request.

In order to solve the above-described problems, the present application further provides a video playing method comprising: sending a download request directed to target video data to the server, and receiving an index file of the target video data fed back by the server; wherein the index file includes a file address directed to encrypted fragmented data and a specified string, the fragmented data obtained by segmenting the target video data; constructing an access request based on the specified string in the index file, and sending the access request to the server to acquire from the server a preset key which the access request is directed to; sending to the server a file acquisition request that includes a file address of the fragmented data to acquire from the server the encrypted fragmented data which a file address of the fragmented data is directed to; decrypting the acquired encrypted fragmented data by using the preset key, and playing the decrypted fragmented data.

In order to solve the above-described problems, the present application further provides a client comprising a memory and a processor, the memory storing a computer program, the processor, when executing the computer program, performs the following steps: sending a download request directed to target video data to the server, and receiving an index file of the target video data fed back by the server; wherein the index file includes a file address directed to encrypted fragmented data and a specified string, the fragmented data obtained by segmenting the target video data; constructing an access request based on the specified string in the index file, and sending the access request to the server to acquire from the server a preset key which the access request is directed to; sending to the server a file acquisition request that includes a file address of the fragmented data to acquire from the server the encrypted fragmented data which a file address of the fragmented data is directed to; decrypting the acquired encrypted fragmented data by using the preset key, and playing the decrypted fragmented data.

Accordingly, the technical solution provided in the present application may be improved on the basis of the present HLS protocol. When constructing an index file, a server storing the target video data first generates an initial index file in a conventional manner. The initial index file may include file addresses of each piece of encrypted fragmented data and plaintext information of the preset key used for the encryption. In order to prevent the preset key presented in the plaintext form from being directly acquired, the server in the present application may replace the preset key with a specified string, and may use the modified index file as an index file of the target video data. When the client wants to download the target video data, the server may deliver the modified index file to the client. The client may not directly acquire from the modified index file the preset key used to encrypt the fragmented data, but may only acquire the above-described specified string. In the present application, a set of private rules may be preset in the client having an authority of accessing to the target video data, and the private rules may construct an access request to the preset key based on the above-described specified string. In this way, the client may not acquire the preset key from the server unless through the access request, thereby decrypting the downloaded encrypted fragmented data. However, those clients that do not have an authority of accessing to the target video data will by no means know the above-described private rules, and therefore may not construct an access request that meets the requirements. In this way, clients that do not have an access authority may not acquire the preset key, such that the encrypted fragmented data may not be played normally. In this way, the copyright of the target video data can be protected. Further, in order to prevent the preset key transmitted between the server and the client from being intercepted, the preset key stored in the server may be encrypted in a second time by using a specified key which may be pre-stored in a client having an access authority. In this way, after acquiring the encrypted key, the client having an access authority may decrypt the encrypted key through a specified built-in key, thereby restoring to acquire the preset key. In this way, protection of the copyright is further improved.

BRIEF DESCRIPTION OF THE DRAWINGS

In order to illustrate technical solutions in embodiments of the present application more clearly, drawings used in the description of the embodiments will be briefly described below. It is obvious that the drawings in the following description are only some embodiments of the present application. For ordinarily skilled persons in the existing technologies, other drawings may also be acquired based on these drawings without any inventive effort.

DETAILED DESCRIPTION

In order to clarify the objective, the technical solutions and advantages of the present application, embodiments of the present application will herein be further described with reference to the drawings.

Embodiment 1

The present application provides a key providing method which may be applied to system architecture of a server and a client. The server may be a device that stores video data. The server may, for example, be a service server of a video playing website. The server may be a separate server or a cluster of a plurality of servers, and the number of the servers is not limited here. The client may be a terminal device used by a user. The client may be, for example, a television box, a set top box, a smart phone, a smart TV, a tablet computer, a portable computer, a desktop computer, a smart wearable device, and the like. Surely, the client may further be software running in the above-described electronic devices. For example, the client may be an application or player provided by a video playing website. For example, the client may be Youku APP, Tencent Video APP, LeTV APP, and the like.

Figure 1:
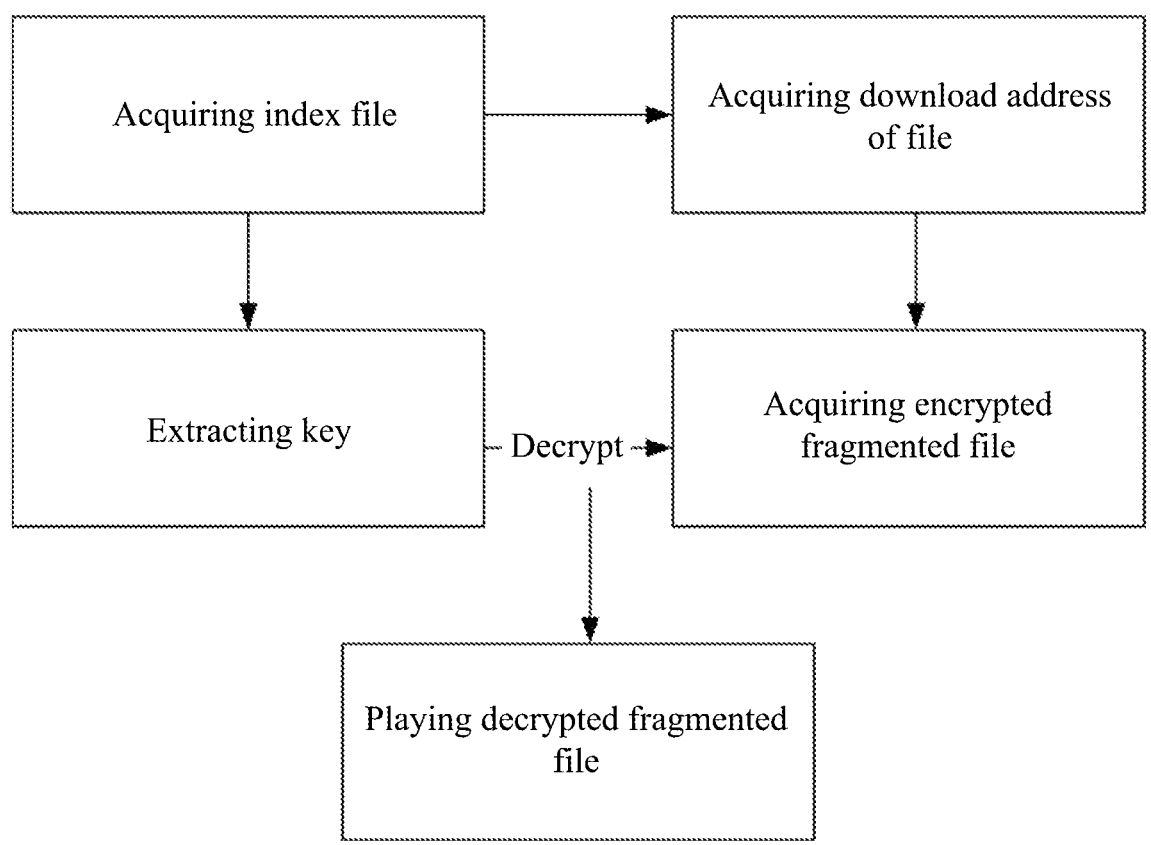
FIG. 1 is a flowchart of video playing according to the HLS protocol in the existing technologies.
Figure 2:
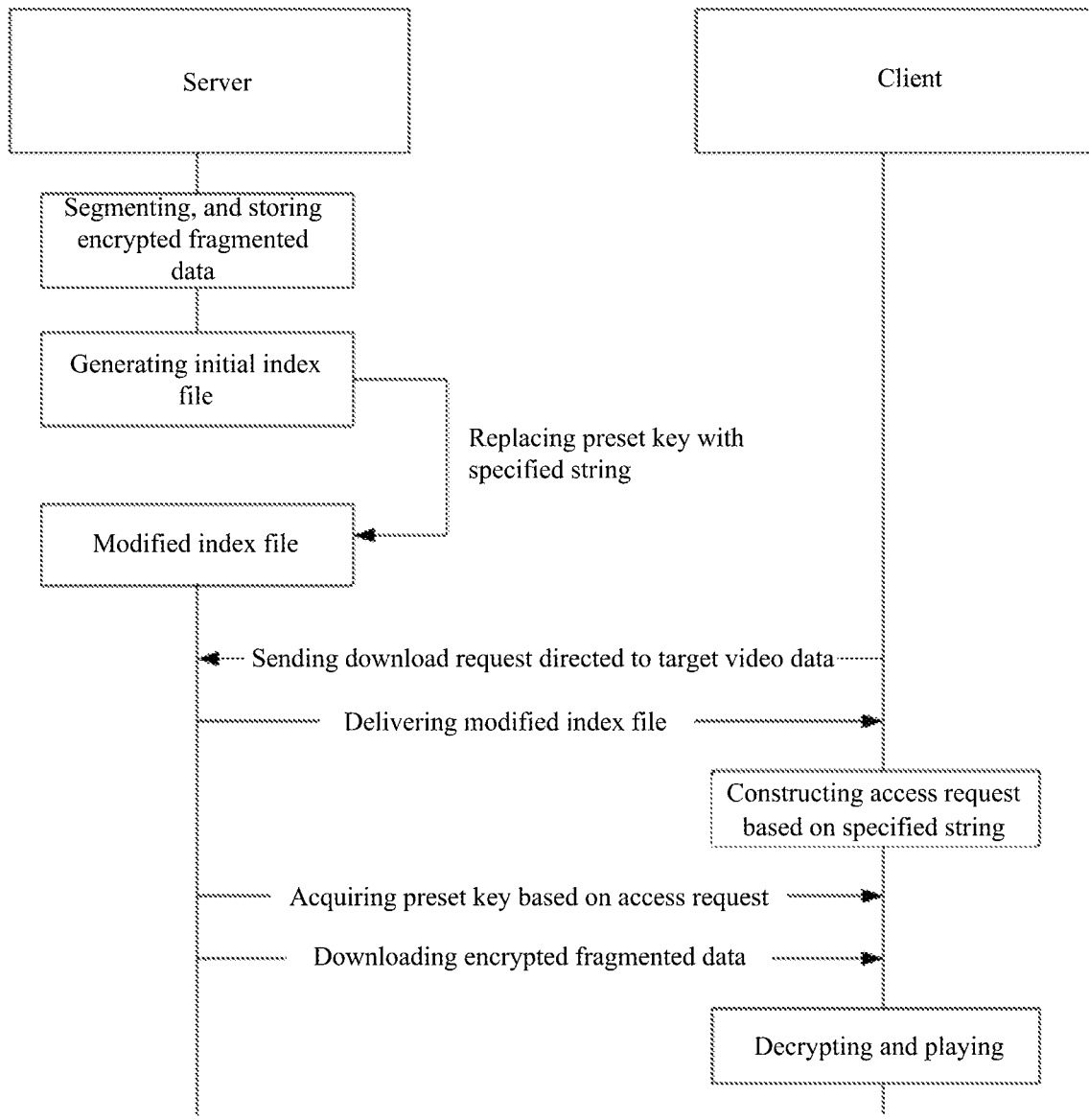
FIG. 2 is a schematic diagram of video playing interaction under an improved HLS protocol in an embodiment of the present application.

This embodiment provides a key providing method, and an execution subject in this embodiment may be the above-described server. With reference to FIG. 2, the method may include the following steps.

S11: Target video data are segmented into a plurality of fragmented data which are respectively encrypted based on a preset key, and the encrypted fragmented data are stored in a specified directory to generate a file address of each piece of the encrypted fragmented data.

In this embodiment, following the HLS protocol, the server may segment the complete target video data into a plurality of fragmented data in advance. Specifically, the server may perform segmenting on the target video data according to a fixed duration. For example, the server may segment the target video data into a plurality of fragmented data according to a duration of 10 seconds. After obtaining a plurality of fragmented data, each piece of fragmented data may be assigned a unique identifier for distinguishing different fragmented data. For example, there are currently a total of three pieces of fragmented data, identifiers for which may be A-1, A-2, and A-3, respectively.

In this embodiment, after segmenting and obtaining the fragmented data, the server may encrypt each piece of fragmented data by using a preset encryption algorithm. For example, the server may encrypt the fragmented data by using an encryption algorithm of Advanced Encryption Standard (AES). In the encryption process, it is usually necessary to use a preset key which may be used not only to encrypt fragmented data, but also to decrypt the encrypted fragmented data.

In this embodiment, after the server encrypts each piece of fragmented data, the encrypted fragmented data may be stored in a specified directory. In this way, file addresses of each piece of encrypted fragmented data may be generated. Based on the file addresses, the directory storing the encrypted fragmented data may be located so as to acquire the corresponding encrypted fragmented data.

S13: An initial index file is generated. Here the initial index file includes the file address of each piece of the encrypted fragmented data and the preset key.

In this embodiment, after segmentation, encryption and storage are performed on the target video data, the initial index file may be generated according to the requirements of the HLS protocol. Information of each piece of fragmented data may be included in the initial index file. For example, the initial index file may include a duration of each piece of fragmented data, an encryption algorithm used when encrypting the fragmented data, a file address of each piece of the encrypted fragmented data, and a preset key used when performing encryption.

S15: The preset key in the initial index file is replaced with a specified string to obtain a modified index file which serves as an index file of the target video data.

In this embodiment, in order to prevent the preset key presented in plaintext from being directly acquired from the initial index file by any client, the specified string may be used to replace the preset key in the initial index file after the initial index file is obtained, so as to obtain the modified index file. In this way, the client cannot directly acquire the preset key from the modified index file but only can acquire the above-described specified string.

In this embodiment, after the initial index file is modified, the modified index file may replace the previous initial index file, so that the modified index file is used as the index file of the target video data. If a client needs to download the target video data, the server may provide the modified index file to the client.

S17: A download request, that is sent by a client and is directed to the target video data, is received, and the modified index file is provided to the client, so that the client constructs an access request, that is directed to the preset key, based on the specified string in the modified index file.

In this embodiment, since the position in the modified index file where the preset key was stored is replaced by the specified string, the client may attempt to decrypt the encrypted fragmented data by using the specified string when the client processes the modified index file according to the existing HLS protocol. However, such a decryption process may fail, rendering that the client cannot play the fragmented data normally. In view of this, in the present application, a set of private rules may be preset in a client having an authority of accessing to the target video data, and the private rules may process the modified index file in some improved manner, such that a client having the access authority may correctly decrypt the encrypted fragmented data. The client having the access authority may be a client that has purchased the copyright of the target video data. For example, if Youku has purchased the copyright of a certain network drama, the above-described private rules may be pre-installed in the player of Youku, such that the network drama may be viewed normally through the player of Youku. However, any other player that has not purchased the copyright cannot play the network drama properly because the private rules are not installed inside it.

In this embodiment, after the download request, that is sent by the client and is directed to the target video data, is received, the modified index file may be provided to the client. At this time, if the client has an authority of accessing to the target video data, the specified string may be processed based on the private rules, so as to construct an access request directed to the preset key. Specifically, the private rules may define each component of the access request. The access request may include the specified string which may be used for sending the constructed access request correctly to the server which is acknowledged that the constructed access request is used for acquiring the preset key. Besides, the access request may further include a verification string added by the client. The server will not deliver the preset key to the client unless the verification string is verified by the server.

In this embodiment, the verification string may include two parts, one of which is a server-predicted time and the other a factory-set value. The server-predicted time may be a time calculated by the client in a certain manner. Specifically, when the client starts running, the client may obtain the current server time from the server. Provided by the server, the current server time is marked as A. At this time, the client may calculate a time difference A−B1 between the current server time A and its own time B1. The time difference may be used as a deviation between the server time and the client time. Therefore, when the client constructs the access request, a period of time has passed since the client started running. At this time, the client may calculate to obtain the server-predicted time which may be represented by B2+(A−B1) based on its own current time B2 and the time difference A−B1. In this embodiment, the server-predicted time may be used to indicate the timeliness of the constructed access request. After receiving the access request, the server may calculate a difference between a current time of the server and the server-predicted time in the access request. If the difference is less than or equal to a specified threshold, it means that the access request is valid, and further processing may be performed. If the difference is greater than the specified threshold, it means that the access request has expired and the access request may be directly rejected.

In this embodiment, in addition to the server-predicted time, the verification string may further include a factory-set value which may have been preset in a client having an access authority. For example, the factory-set value may be a string of hexadecimal data. The factory-set value may be provided by the issuer of the target video data after the client purchases the authority of accessing to the target video data. In this way, clients that do not have an access authority will not have the above-described factory-set value.

S19: The access request sent by the client is received, and the preset key is provided to the client in response to the access request.

In this embodiment, the access request constructed by the client may be a Universal Resource Locator (URL) through which the client may access the server. After receiving the access request sent by the client, the server may verify the verification string in the access request. Specifically, the server may first calculate a difference between a current system time of the server and a server-predicted time in the access request, and when the difference is less than or equal to a specified threshold, it means that the access request is valid, so that the factory-set value in the access request may be further determined. When the factory-set value in the access request is consistent with the preset factory-set value, it indicates that the factory-set value in the access request is also valid, and the preset key may be provided to the client. The preset factory-set value may be a corresponding factory-set value of the target video data in the server. For example, the preset factory-set value may be an authorization code of the target video data. In the server, the factory-set value corresponding to each piece of video data may be stored in association with the identifier of the video data. In this way, after the above-described access request is received, the server may obtain the preset factory-set value by checking the identifier of the target video data, after which the preset factory-set value may be compared with the factory-set value in the access request. When they are consistent, it means that the client that sends the access request has an access authority.

In an embodiment of the present application, in order to prevent illegal software from intercepting data interacted between the server and the client to acquire the preset key sent to the client from the server, the server may perform a secondary encryption to the preset key in advance. Specifically, the server may encrypt the preset key by using the specified key, and store the encrypted key in the directory which the specified string is directed to. In this embodiment, a common encryption algorithm may be used to perform a secondary encryption to the preset key. For example, the preset key may be encrypted by a symmetric encryption algorithm, an asymmetric encryption algorithm, a hash algorithm, or the like. The specified key may be predetermined by the issuer or publication platform of the video data, and the specified key may be built in the client having an access authority. In this way, after receiving the access request sent by the client, the server may provide the encrypted key to the client. The client may restore the encrypted key to the preset key based on the specified built-in key.

In an embodiment of the present application, the client may further acquire corresponding encrypted fragmented data from the server based on the file address in the modified index file. Specifically, the server may receive a file acquisition request sent by the client. The file acquisition request includes a file address identified from the modified index file. The file address may be a directory in which the encrypted fragmented data is stored in the server. In this way, the file acquisition request may be directed to the encrypted fragmented data. After the file acquisition request is received, the server may deliver the encrypted fragmented data, to which the file acquisition request is directed, to the client. After the encrypted fragmented data are received, the client may decrypt the encrypted fragmented data by using the above-described acquired preset key, so that the decrypted fragmented data may be played.

Embodiment 2

Figure 3:
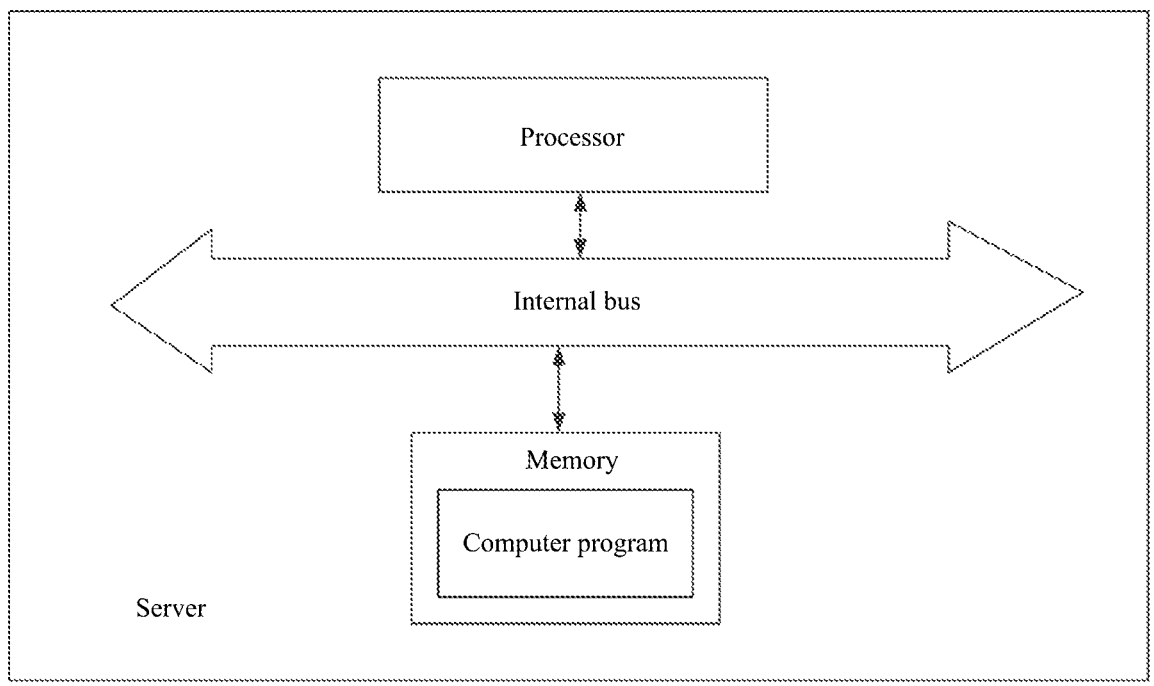
FIG. 3 is a schematic diagram showing a structure of a server in an embodiment of the present application.

With reference to FIG. 3, the present application further provides a server including a memory and a processor. The memory stores a computer program, and the processor, when executing the computer program, performs the following steps:

S11: target video data are segmented into a plurality of fragmented data which are respectively encrypted based on a preset key, and the encrypted fragmented data are stored in a specified directory to generate a file address of each piece of the encrypted fragmented data.

S13: an initial index file is generated. Here the initial index file includes the file address of each piece of the encrypted fragmented data and the preset key.

S15: the preset key in the initial index file is replaced with a specified string to obtain a modified index file which serves as an index file of the target video data.

S17: a download request, that is sent by a client and is directed to the target video data, is received, and the modified index file is provided to the client, so that the client constructs an access request, that is directed to the preset key, based on the specified string in the modified index file.

S19: the access request sent by the client is received, and the preset key is provided to the client in response to the access request.

In one embodiment, the processor, when executing the computer program, further performs the following steps.

The preset key is encrypted by using a specified key, and the encrypted key is stored in the directory which the specified string is directed to.

Accordingly, the encrypted key is provided to the client after the access request sent by the client is received, so that the client restores the encrypted key to the preset key based on the specified built-in key.

In one embodiment, the processor, when executing the computer program, further performs the following steps:

A file acquisition request sent by the client is received. Here the file acquisition request includes a file address identified from the modified index file.

The encrypted fragmented data, which the file acquisition request is directed to, is delivered to the client, so that the client decrypts the encrypted fragmented data by using the preset key, and plays the decrypted fragmented data.

In this embodiment, the memory may include a physical means for storing information, which typically digitizes the information and then storing it in a medium that utilizes electrical, magnetic or optical means. The memory according to this embodiment may further include: a device for storing information in an electrical manner, such as a RAM, a ROM, or the like; a device for storing information in a magnetic manner, such as a hard disk, a floppy disk, a magnetic tape, a magnetic core memory, a magnetic bubble memory, and a USB flash drive; a device for storing information in an optical manner, such as a CD or a DVD. Surely, there are memories working in other manners, such as a quantum memory, a graphene memory, and the like.

In this embodiment, the processor may be implemented in any proper manner. For example, the processor may take the form of, for example, a microprocessor or processor with a computer-readable medium storing computer-readable program codes (e.g., software or firmware) executable by the (micro)processor, a logic gate, a switch, an Application Specific Integrated Circuit (ASIC), a programmable logic controller and an embedded microcontroller and the like.

The specific functions implemented by the memory and processor of the server provided in the embodiment of the present specification may be explained in referring to the preceding embodiments in the present specification, and the technical effects of the preceding embodiments may be achieved, for which details will not be repeated here.

Embodiment 3

Figure 4:
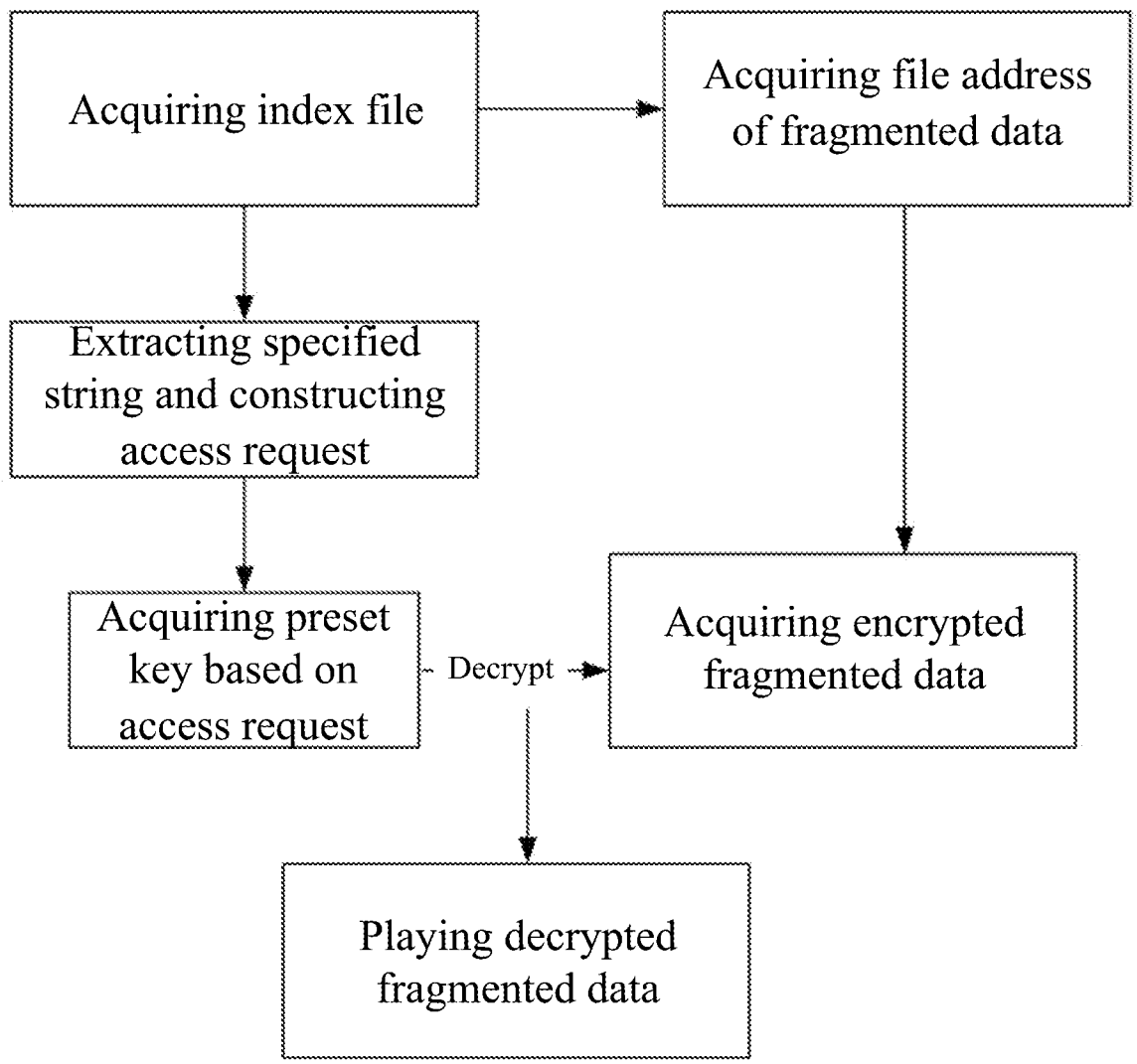
FIG. 4 is a flowchart of a video playing method in an embodiment of the present application.

The present application further provides a video playing method which may be applied to the above-described client. With reference to FIGS. 2 and 4, the method includes the following steps:

S21: a download request directed to target video data is sent to the server, and an index file of the target video data fed back by the server is received. Here, the index file includes a file address directed to encrypted fragmented data and a specified string, the fragmented data obtained by segmenting the target video data.

In this embodiment, the client may send to the server the download request directed to the target video data according to the download address of the target video data. The download request may carry an identifier of the target video data. The identifier may be, for example, a storage directory of the target video data in the server, or a data number of the target video data in the server. In this way, the server may determine the target video data to be downloaded by the client based on the download request.

In this embodiment, segmenting may be first performed to the target video data by the server, and a corresponding index file is generated. The index file may be obtained by modifying an index file that follows the HLS protocol. Specifically, the server may first generate an initial index file of the target video data according to the requirements of the HLS protocol. The initial index file may include information of each piece of fragmented data. For example, the initial index file may include a duration of each piece of fragmented data, an encryption algorithm used when encrypting the fragmented data, a file address of each piece of the encrypted fragmented data, and a preset key used when performing encryption. In order to prevent the preset key presented in plaintext from being directly acquired from the initial index file by any client, the server may use the specified string to replace the preset key in the initial index file after the initial index file is obtained, so as to obtain the modified index file. The modified index file may be used as an index file of the target video data. In this way, after receiving from the client the download request directed to the target video data, the server may provide the modified index file to the client. In this way, the index file received by the client may include a file address directed to the encrypted fragmented data and the specified string, and the fragmented data may be obtained by segmenting the target video data.

S23: An access request is constructed based on the specified string in the index file, and the access request is sent to the server to acquire from the server a preset key which the access request is directed to.

In this embodiment, a set of private rules may be preset in a client having an authority of accessing to the target video data, and the private rules may process the modified index file in some improved manner, such that a client having an access authority may correctly decrypt the encrypted fragmented data. The client having an access authority may be a client that has purchased the copyright of the target video data. For example, if Youku has purchased the copyright of a certain network drama, the above-described private rules may be pre-installed in the player of Youku, such that the network drama may be viewed normally through the player of Youku. However, any other player that has not purchased the copyright may not play the network drama properly because the private rules are not installed in it.

In this embodiment, if the client has an authority of accessing to the target video data, the specified string may be processed based on the private rules, so as to construct an access request. Specifically, the private rules may define each component of the access request. The access request may include the specified string which may be used for sending the constructed access request correctly to the server which is acknowledged that the constructed access request is used for acquiring the preset key. Besides, the access request may further include a verification string added by the client. The server will not deliver the preset key to the client unless the verification string is verified by the server.

In this embodiment, the verification string may include two parts, one of which is a server-predicted time and the other a factory-set value. The server-predicted time may be a time calculated by the client in a certain manner. Specifically, when the client starts running, the client may obtain the current server time from the server. Provided by the server, the current server time is marked as A. At this time, the client may calculate a time difference A−B1 between the current server time A and its own time B1. The time difference may be used as an error between the server time and the client time. Therefore, when the client constructs the access request, a period of time has passed since the client started running. At this time, the client may calculate to obtain the server-predicted time which may be represented by B2+(A−B1) based on its own current time B2 and the time difference A−B1. In this embodiment, the server-predicted time may be used to indicate the timeliness of the constructed access request. After receiving the access request, the server may calculate a difference between a current time of the server and the server-predicted time in the access request. If the difference is less than or equal to a specified threshold, it means that the access request is valid, and further processing may be performed. If the difference is greater than the specified threshold, it shows that the access request has expired and the access request may be directly rejected.

In this embodiment, in addition to the server-predicted time, the verification string may further include a factory-set value which may have been preset in a client having an access authority. For example, the factory-set value may be a string of hexadecimal data. The factory-set value may be provided by the issuer of the target video data after the client purchases the authority of accessing to the target video data. In this way, clients that do not have an access authority will not have the above-described factory-set value.

In this embodiment, the access request constructed by the client may be a URL through which the client may access the server. After receiving the access request sent by the client, the server may verify the verification string in the access request. After being verified, the client may acquire the preset key used by the server when encrypting the fragmented data.

S25: A file acquisition request that includes a file address of the fragmented data is sent to the server to acquire from the server the encrypted fragmented data which a file address of the fragmented data is directed to.

S27: The acquired encrypted fragmented data are decrypted by using the preset key, and the decrypted fragmented data are played.

In this embodiment, the client may further acquire corresponding encrypted fragmented data from the server based on the file address in the modified index file. Specifically, the client may send to the server a file acquisition request including the file address of the fragmented data. The file address may be a directory in which the encrypted fragmented data is stored in the server. In this way, the file acquisition request may be directed to the encrypted fragmented data. After the file acquisition request is received, the server may deliver to the client the encrypted fragmented data which the file acquisition request is directed to. After the client receives the encrypted fragmented data, the encrypted fragmented data may be decrypted by using the above-described acquired preset key, so that the decrypted fragmented data may be played.

In an embodiment of the present application, in order to prevent illegal software from intercepting data interacted between the server and the client to acquire the preset key sent to the client from the server, the server may perform a secondary encryption to the preset key in advance. Specifically, the server may encrypt the preset key by using the specified key, and store the encrypted key in the directory which the specified string is directed to. In this embodiment, a common encryption algorithm may be used to perform a secondary encryption to the key. For example, the key may be encrypted by a symmetric encryption algorithm, an asymmetric encryption algorithm, a hash algorithm, or the like. The specified key may be predetermined by the issuer or publication platform of the video data, and the specified key may be built in the client having an access authority. In this way, the preset key acquired by the client from the server is a key that is encrypted by using the specified key. After the encrypted key is acquired, the client may decrypt the acquired preset key into an original key based on the specified built-in key, and subsequently, the acquired encrypted fragmented data may be decrypted by using the original key, and the decrypted fragmented data are displayed.

Embodiment 4

Figure 5:
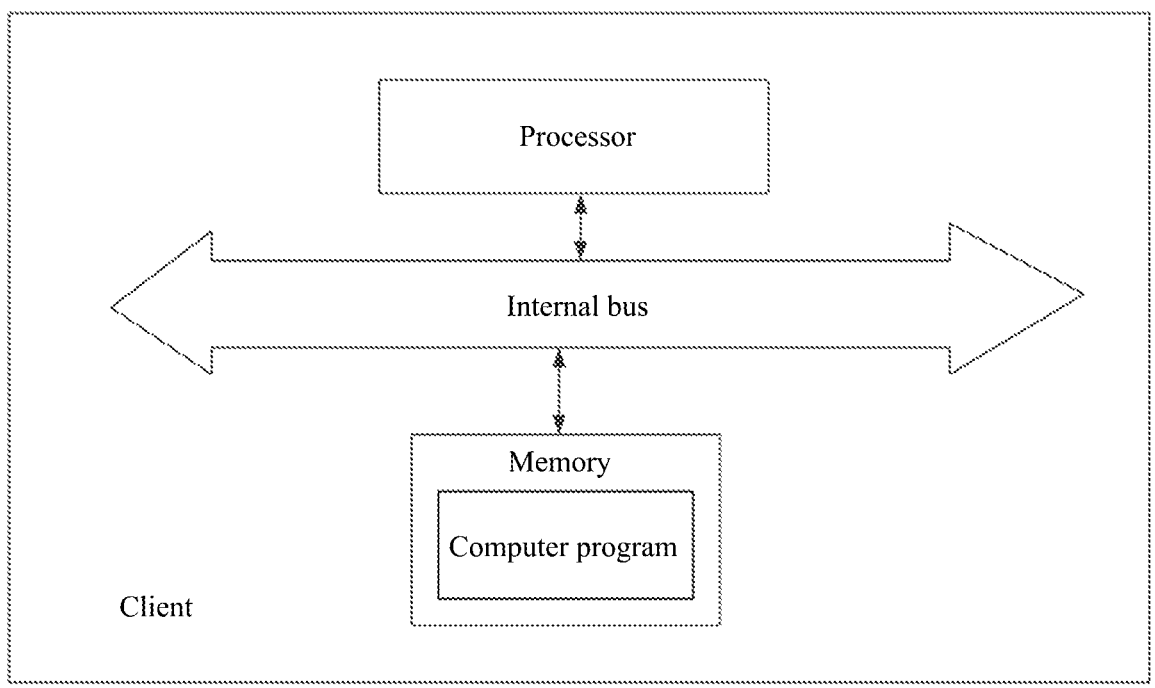
FIG. 5 is a schematic diagram showing a structure of a client in an embodiment of the present application.

With reference to FIG. 5, the present application further provides a client comprising a memory and a processor, the memory storing a computer program, and the processor, when executing the computer program, performs the following steps:

S21: a download request directed to target video data is sent to the server, and an index file of the target video data fed back by the server is received. Here, the index file includes a file address directed to encrypted fragmented data and a specified string, the fragmented data obtained by segmenting the target video data.

S23: an access request is constructed based on the specified string in the index file, and the access request is sent to the server to acquire from the server a preset key which the access request is directed to.

S25: a file acquisition request that includes a file address of the fragmented data is sent to the server to acquire from the server the encrypted fragmented data which a file address of the fragmented data is directed to.

S27: the acquired encrypted fragmented data is decrypted by using the preset key, and the decrypted fragmented data is played.

In one embodiment, the access request includes the specified string and a verification string added by the client; wherein the verification string includes a server-predicted time and a factory-set value; correspondingly, the processor, when executing the computer program, further performs the following steps.

The client acquires a current server time from the server, and calculates a time difference between the current server time and the client's own time, when the client starts running.

The server-predicted time is obtained by calculation based on the client's current time and the time difference, when the client constructs the access request.

In one embodiment, the preset key acquired from the server is a key that is encrypted by using a specified key; accordingly, the processor, when executing the computer program, performs the following steps.

The acquired preset key is decrypted into an original key based on the specified built-in key.

The acquired encrypted fragmented data is decrypted by using the original key, and the decrypted fragmented data is played.

In this embodiment, the memory may include a physical means for storing information, which typically digitizes the information and then storing it in a medium that utilizes electrical, magnetic or optical means. The memory according to this embodiment may further include: a device for storing information in an electrical manner, such as a RAM, a ROM, or the like; a device for storing information in a magnetic manner, such as a hard disk, a floppy disk, a magnetic tape, a magnetic core memory, a magnetic bubble memory, and a USB flash drive; a device for storing information in an optical manner, such as a CD or a DVD. Surely, there are memories working in other manners, such as a quantum memory, a graphene memory, and the like.

In this embodiment, the processor may be implemented in any proper manner. For example, the processor may take the form of, for example, a microprocessor or processor with a computer-readable medium storing computer-readable program codes (e.g., software or firmware) executable by the (micro)processor, a logic gate, a switch, an Application Specific Integrated Circuit (ASIC), a programmable logic controller and an embedded microcontroller and the like.

The specific functions implemented by the memory and processor of the server provided in the embodiment of the present specification may be explained in referring to the preceding embodiments in the present specification, and the technical effects of the preceding embodiments may be achieved, for which details will not be described herein again.

Figure 6:
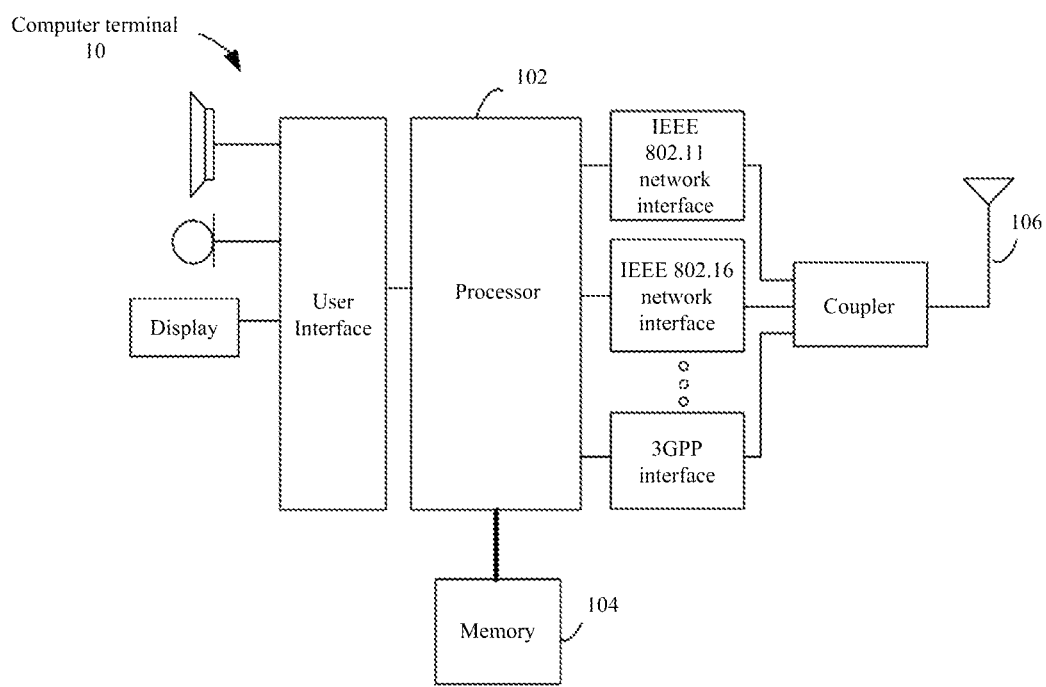
FIG. 6 is a schematic diagram showing a structure of a computer terminal in an embodiment of the present application.

With reference to FIG. 6, in this application, the technical solutions in the above-described embodiments may be applied to a computer terminal 10 shown in FIG. 6. The computer terminal 10 may include one or more (only one is shown in the figure) processor(s) 102 which may include but not limited to a processing device such as a microprocessor MCU or a programmable logic device FPGA, a memory 104 for storing data, and a transmission module 106 for communication functions. Ordinarily skilled persons in the art may appreciate that the structure shown in FIG. 6 is only a schematic diagram which does not put a limit to the structure of the above-described electronic device. For example, the computer terminal 10 may further include components more than or less than those shown in FIG. 6, or has a configuration different from what is shown in FIG. 6.

The memory 104 may be used to store software programs and modules of application software, and the processor 102 executes various functional applications and data processing by running software programs and modules stored in the memory 104. The memory 104 may include high-speed random access memories, and may also include non-volatile memories such as one or more magnetic storage devices, flash memory(ies), or other non-volatile solid-state memories. In some examples, the memory 104 may further include a memory remotely located relative to the processor 102. These remote memories may be connected to the computer terminal 10 via a network. Examples of such networks include, but are not limited to, the Internet, intranets, local area networks, mobile communication networks, and combinations thereof.

The transmission device 106 is used for receiving or sending data via a network. Specific examples of the above-described network may include a wireless network provided by a communication provider of the computer terminal 10. In one example, the transmission device 106 includes a Network Interface Controller (NIC) which may be connected to other network devices via a base station to communicate with the Internet. In one example, the transmission device 106 may be a radio frequency (RF) module which may be used for communication with the Internet wirelessly.

The numbers of the above-described embodiments of the present application are only used to facilitate description, but do not represent whether an embodiment is advantageous or not.

The embodiments are ranked in a progressive manner in the present specification, and the same or similar parts between the embodiments may be referred to by each other. Each embodiment focuses on differences from other embodiments. In particular, the embodiments of the server and the client may be explained with reference to the embodiments of the foregoing methods.

Accordingly, the technical solution provided in the present application may be improved on the basis of the present HLS protocol. When constructing an index file, a server storing the target video data first generates an initial index file in a conventional manner. The initial index file may include file addresses of each piece of encrypted fragmented data and plaintext information of the preset key used for the encryption. In order to prevent the preset key presented in the plaintext form from being directly acquired, the server in the present application may replace the preset key with a specified string, and may use the modified index file as an index file of the target video data. When the client wants to download the target video data, the server may deliver the modified index file to the client. The client may not directly acquire from the modified index file the preset key used to encrypt the fragmented data, but may only acquire the above-described specified string. In the present application, a set of private rules may be preset in the client having an authority of accessing to the target video data, and the private rules may construct an access request to the preset key based on the above-described specified string. In this way, the client may not acquire the preset key from the server unless through the access request, thereby decrypting the downloaded encrypted fragmented data. However, those clients that do not have an authority of accessing to the target video data will by no means know the above-described private rules, and therefore may not construct an access request that meets the requirements. In this way, clients that do not have an access authority may not acquire the preset key, such that the encrypted fragmented data may not be played normally. In this way, the copyright of the target video data can be protected. Further, in order to prevent the preset key transmitted between the server and the client from being intercepted, the preset key stored in the server may be encrypted in a second time by using a specified key which may be pre-stored in a client having an access authority. In this way, after acquiring the encrypted key, the client having an access authority may decrypt the encrypted key through a specified built-in key, thereby restoring to acquire the preset key. In this way, protection of the copyright is further improved.

According to the description of the above-described embodiments, persons skilled in the art may clearly understand that the embodiments can be implemented by means of software plus a necessary general hardware platform or by hardware. Based on this understanding, the above-described technical solutions may be substantially, or the parts contributing to the existing technologies may be embodied in the form of software products. The software products may be stored in a computer-readable storage medium such as an ROM/RAM, a magnetic Disc, an optical disc, and the like, including certain instructions that enable a computer device (which may be a personal computer, a server, or a network device, etc.) to perform the methods described in the embodiments or in some portions of the embodiments.

The above description discloses only preferred embodiment of the present application, and is not intended to limit the present application. Any modifications, equivalent substitutions, improvements, etc. within the spirit or principle of the present application shall be included in the protection scope of the present application.

What is claimed is:

1. A key providing method, comprising:
    segmenting target video data into a plurality of fragmented data, respectively encrypting the plurality of fragmented data based on a preset key, and storing the encrypted fragmented data in a specified directory to generate a file address of each piece of the encrypted fragmented data;
    generating an initial index file which includes the file address of each piece of the encrypted fragmented data and the preset key;
    replacing the preset key in the initial index file with a specified string to obtain a modified index file which serves as an index file of the target video data;
    receiving a download request that is sent by a client and is directed to the target video data, and providing the modified index file to the client, so that the client constructs an access request, that is directed to the preset key, based on the specified string in the modified index file;
    receiving the access request sent by the client, and providing the preset key to the client in response to the access request;
    wherein the access request includes the specified string and a verification string added by the client wherein the verification string includes a server-predicted time and a factory-set value;
    after receiving the access request sent by the client, the method further comprises:
    calculating a difference between a current time of the server and the server-predicted time in the access request;
    providing the preset key to the client when the difference is less than or equal to a specified threshold and the factory-set value in the access request is consistent with a preset factory-set value.

2. The method according to claim 1, wherein the server-predicted time is determined by the client in the following manner:
    the client acquiring a current server time from the server, and calculating a time difference between the current server time and the client's own time, when the client starts running;
    calculating to obtain the server-predicted time based on the client's current time and the time difference, when the client constructs the access request.

3. The method according to claim 1, wherein after the modified index file is used as the index file of the target video data, the method further comprises:
    encrypting the preset key with a specified key, and saving the encrypted key in a directory which the specified string is directed to;
    correspondingly, providing the encrypted key to the client after receiving the access request sent by the client, so that the client restores the encrypted key to the preset key based on the specified built-in key.

4. The method according to claim 1, wherein after providing the preset key to the client, the method further comprises:
    receiving a file acquisition request sent by the client, wherein the file acquisition request includes a file address identified from the modified index file; and
    delivering encrypted fragmented data to which the file acquisition request is directed to the client, so that the client decrypts the encrypted fragmented data by using the preset key, and plays the decrypted fragmented data.

5. A server, comprising a memory and a processor, the memory storing a computer program, wherein the processor, when executing the computer program, performs the following steps:

segmenting target video data into a plurality of fragmented data, respectively encrypting the plurality of fragmented data based on a preset key, and storing the encrypted fragmented data in a specified directory to generate a file address of each piece of the encrypted fragmented data;

generating an initial index file which includes the file address of each piece of the encrypted fragmented data and the preset key;

replacing the preset key in the initial index file with a specified string to obtain a modified index file which serves as an index file of the target video data;

receiving a download request that is sent by a client and is directed to the target video data, and providing the modified index file to the client, so that the client constructs an access request, that is directed to the preset key based on the specified string in the modified index file;

receiving the access request sent by the client, and providing the preset key to the client in response to the access request;

wherein the access request includes the specified string and a verification string added by the client wherein the verification string includes a server-predicted time and a factory-set value;

after receiving the access request sent by the client, the processor executing the computer program further performs the following steps:

calculating a difference between a current time of the server and the server-predicted time in the access request;

providing the preset key to the client when the difference is less than or equal to a specified threshold and the factory-set value in the access request is consistent with a preset factory-set value.

6. The server according to claim 5, wherein the processor, when executing the computer program, further performs the following steps:

encrypting the preset key with a specified key, and saving the encrypted key in a directory which the specified string is directed to;

providing the encrypted key to the client after receiving the access request sent by the client, so that the client restores the encrypted key to the preset key based on the specified built-in key.

7. The server according to claim 5, wherein the processor executing the computer program further implements the following steps:

receiving a file acquisition request sent by the client, wherein the file acquisition request includes a file address identified from the modified index file; and delivering encrypted fragmented data to which the file acquisition request is directed to the client, so that the client decrypts the encrypted fragmented data by using the preset key, and plays the decrypted fragmented data.

8. A video playing method, comprising:

sending a download request directed to target video data to the server, and receiving an index file of the target video data fed back by the server; wherein the index file includes a file address directed to encrypted fragmented data and a specified string, the fragmented data obtained by segmenting the target video data;

constructing an access request based on the specified string in the index file, and sending the access request to the server to acquire from the server a preset key which the access request is directed to;

sending to the server a file acquisition request that includes a file address of the fragmented data to acquire from the server the encrypted fragmented data which a file address of the fragmented data is directed to;

decrypting the acquired encrypted fragmented data by using the preset key, and playing the decrypted fragmented data;

wherein the access request includes the specified string and a verification string added by the client wherein the verification string includes a server-predicted time and a factory-set value; and wherein the preset key is provided by the server when a difference between a current time of the server and the server-predicted time in the access request is less than or equal to a specified threshold and the factory-set value in the access request is consistent with a preset factory-set value.

9. The method according to claim 8, wherein the server-predicted time is determined by the client in the following manner:

the client acquiring a current server time from the server, and calculating a time difference between the current server time and the client's own time, when the client starts running;

calculating to obtain the server-predicted time based on the client's current time and the time difference, when the client constructs the access request.

10. The method according to claim 8, wherein the preset key acquired from the server is a key that is encrypted by using a specified key; correspondingly, after the preset key is obtained, the method further comprises:

decrypting the acquired preset key into an original key based on the specified built-in key;

decrypting the acquired encrypted fragmented data by using the original key, and playing the decrypted fragmented data.

11. A client, comprising a memory and a processor, the memory storing a computer program, wherein the processor, when executing the computer program, performs the following steps:

sending a download request directed to target video data to the server, and receiving an index file of the target video data fed back by the server; wherein the index file includes a file address directed to encrypted fragmented data and a specified string, the fragmented data obtained by segmenting the target video data;

constructing an access request based on the specified string in the index file, and sending the access request to the server to acquire from the server a preset key which the access request is directed to;

sending to the server a file acquisition request that includes a file address of the fragmented data to acquire from the server the encrypted fragmented data which a file address of the fragmented data is directed to;

decrypting the acquired encrypted fragmented data by using the preset key, and playing the decrypted fragmented data;

wherein the access request includes the specified string and a verification string added by the client wherein the verification string includes a server-predicted time and a factory-set value; and wherein the preset key is provided by the server when a difference between a current time of the server and the server-predicted time in the access request is less than or equal to a specified threshold and the factory-set value in the access request is consistent with a preset factory-set value.

12. The client according to claim 11, wherein the processor, when executing the computer program, performs the following steps:
  the client acquiring a current server time from the server, and calculating a time difference between the current server time and the client's own time, when the client starts running;
  calculating to obtain the server-predicted time based on the client's current time and the time difference, when the client constructs the access request.

13. The client according to claim 11, wherein the preset key acquired from the server is a key that is encrypted by using a specified key; correspondingly, the processor, when executing the computer program, performs the following steps:
  decrypting the acquired preset key into an original key based on the specified built-in key;
  decrypting the acquired encrypted fragmented data by using the original key, and playing the decrypted fragmented data.

* * * * *